(12) United States Patent
Dong et al.

(10) Patent No.: US 12,573,960 B2
(45) Date of Patent: Mar. 10, 2026

(54) ISOLATED DC-DC CONVERTER

(71) Applicants:Zhejiang University, Zhejiang (CN); Delta Electronics (Shanghai) Co., Ltd., Shanghai (CN)

(72) Inventors: Kai Dong, Shanghai (CN); Wenxing Zhong, Zhejiang (CN); Yuesen Guo, Shanghai (CN); Hui Wang, Shanghai (CN); Jinfa Zhang, Shanghai (CN); Dehong Xu, Zhejiang (CN)

(73) Assignees: Zhejiang University, Zhejiang (CN); Delta Electronics (Shanghai) Co., Ltd., Shanghai (CN)

( * ) Notice: Subject to any disclaimer, the term of this patent is extended or adjusted under 35 U.S.C. 154(b) by 312 days.

(21) Appl. No.: 18/138,476

(22) Filed: Apr. 24, 2023

(65) Prior Publication Data

US 2023/0387813 A1 Nov. 30, 2023

(30) Foreign Application Priority Data

May 24, 2022 (CN) .......................... 202210574734.5

(51) Int. Cl.
H02M 3/335 (2006.01)

(52) U.S. Cl.
CPC ... H02M 3/33573 (2021.05); H02M 3/33576 (2013.01)

(58) Field of Classification Search
CPC ............. H02M 1/0067; H02M 1/0077; H02M 1/0083; H02M 3/01; H02M 3/3323; H02M 3/33569
See application file for complete search history.

(56) References Cited

U.S. PATENT DOCUMENTS

| | | | | |
|---|---|---|---|---|
| 2015/0170822 A1* | 6/2015 | Ye | .......................... | H01F 38/023 336/12 |
| 2019/0214700 A1* | 7/2019 | Wang | ........................ | H01P 1/36 |
| 2019/0348918 A1* | 11/2019 | Ojika | .................. | H02M 3/1588 |

FOREIGN PATENT DOCUMENTS

| | | | | | |
|---|---|---|---|---|---|
| CN | 101951159 A | * | 1/2011 | ............ | H02M 3/338 |
| CN | 101951159 B | | 4/2013 | | |

(Continued)

OTHER PUBLICATIONS

CN101951159 Translation (Year: 2011).*
CN111865085 Translation (Year: 2020).*
WO2015158699 Translation (Year: 2015).*

*Primary Examiner* — Thienvu V Tran
*Assistant Examiner* — Jennifer C Caulk
(74) *Attorney, Agent, or Firm* — KIRTON McCONKIE; Evan R. Witt

(57) ABSTRACT

An isolated DC-DC converter including n conversion circuit units is provided. In each conversion circuit unit, a first connection node is formed between two switching components of a first primary bridge arm, and a second connection node is formed between two electronic components of a second primary bridge arm. A third connection node is formed between two switching components of a first secondary bridge arm, and a fourth connection node is formed between two switching components of a second secondary bridge arm. A first coupling inductor and A first capacitor are serially coupled between the first and third connection nodes. A second coupling inductor and a second capacitor are serially coupled between the second and fourth connection nodes. In the n conversion circuit units, the primary circuit units are electrically connected in series or in parallel, and the secondary circuit units are electrically connected in parallel or in series correspondingly.

10 Claims, 12 Drawing Sheets

(56) References Cited

FOREIGN PATENT DOCUMENTS

| | | | | |
|----|----------------|------|---------|-------------------|
| CN | 103718417 | A | 4/2014 | |
| CN | 107994772 | A | 5/2018 | |
| CN | 108462397 | A | 8/2018 | |
| CN | 109861543 | A | 6/2019 | |
| CN | 111865085 | A * | 10/2020 | ........ H02M 3/33576 |
| CN | 113258687 | A | 8/2021 | |
| CN | 111711347 | B | 11/2021 | |
| EP | 2019481 | A1 | 1/2009 | |
| IN | 914/DEL2007 | A | 11/2007 | |
| WO | WO-2015158699 | A1 * | 10/2015 | ........ H02M 3/33546 |

* cited by examiner

ISOLATED DC-DC CONVERTER

CROSS-REFERENCE TO RELATED APPLICATION

This application claims priority to China Patent Application No. 202210574734.5, filed on May 24, 2022, the entire contents of which are incorporated herein by reference for all purposes.

FIELD OF THE INVENTION

The present disclosure relates to a DC-DC converter, and more particularly to an isolated DC-DC converter.

BACKGROUND OF THE INVENTION

Conventional DC-DC (direct current to direct current) converters realize the isolation by using transformer to meet the insulation requirements. However, as the operating frequency and power density of the DC-DC converter increase, the disadvantage of the transformer in DC-DC converter become more and more obvious. For example, the large size of the transformer would make the power density of the DC-DC converter decrease, and the design for the DC-DC converter may be difficult due to the lower limit of the number of turns of the transformer. In addition, the large loss of the transformer would cause the high overall loss of the DC-DC converter. Moreover, the heat dissipation capacity of the transformer is low, which reduces the overall heat dissipation capacity of the DC-DC converter. Consequently, it is hard to improve the overall efficiency and power density of the conventional DC-DC converter that realizes the isolation by transformer.

Therefore, there is a need of providing a converter in order to overcome the drawbacks of the conventional technologies.

SUMMARY OF THE INVENTION

The present disclosure provides an isolated DC-DC converter with the advantages of small size, low loss and high heat dissipation capacity.

In accordance with an aspect of the present disclosure, an isolated DC-DC converter is provided. The isolated DC-DC converter includes n conversion circuit units, and n is an integer greater than or equal to 2. Each conversion circuit unit includes a primary circuit unit, a secondary circuit unit, a first coupling inductor, a first capacitor, a second coupling inductor and a second capacitor. The primary circuit unit includes a first primary bridge arm and a second primary bridge arm electrically connected in parallel. The first primary bridge arm includes two first switching components electrically connected in series, and a connection node between the two first switching components of the first primary bridge arm forms a first connection node. The second primary bridge arm includes two first electronic components electrically connected in series, and a connection node between the two first electronic components of the second primary bridge arm forms a second connection node. The secondary circuit unit includes a first secondary bridge arm and a second secondary bridge arm electrically connected in parallel. Each of the first and second secondary bridge arms comprises two second switching components electrically connected in series. A connection node between the two second switching components of the first secondary bridge arm forms a third connection node, and a connection node between the two second switching components of the second secondary bridge arm forms a fourth connection node. The first coupling inductor and the first capacitor are electrically coupled in series between the first connection node and the third connection node. The second coupling inductor and the second capacitor are electrically coupled in series between the second connection node and the fourth connection node. The first coupling inductor and the second coupling inductor are coupled to each other. All the primary circuit units of the n conversion circuit units are electrically connected by one of connection modes including series connecting and parallel connecting, and all the secondary circuit units of the n conversion circuit units are electrically connected by a remaining one of the connection modes.

In accordance with another aspect of the present disclosure, an isolated DC-DC converter is provided. The isolated DC-DC converter includes n conversion circuit units, and n is an integer greater than or equal to 2. Each conversion circuit unit includes a primary circuit unit, a secondary circuit unit, a first coupling inductor, a first capacitor, a second coupling inductor and a second capacitor. The primary circuit unit includes a primary bridge arm including two first switching components electrically connected in series, and a connection node between the two first switching components forms a first connection node. A second connection node is formed between one of the two first switching components and an input terminal. The secondary circuit unit includes a first secondary bridge arm and a second secondary bridge arm electrically connected in parallel. Each of the first and second secondary bridge arms comprises two second switching components electrically connected in series. A connection node between the two second switching components of the first secondary bridge arm forms a third connection node, and a connection node between the two second switching components of the second secondary bridge arm forms a fourth connection node. The first coupling inductor and the first capacitor are electrically coupled in series between the first connection node and the third connection node. The second coupling inductor and the second capacitor are electrically coupled in series between the second connection node and the fourth connection node. The first coupling inductor and the second coupling inductor are coupled to each other. All the primary circuit units of the n conversion circuit units are electrically connected by one of connection modes including series connecting and parallel connecting, and all the secondary circuit units of the n conversion circuit units are electrically connected by a remaining one of the connection modes.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
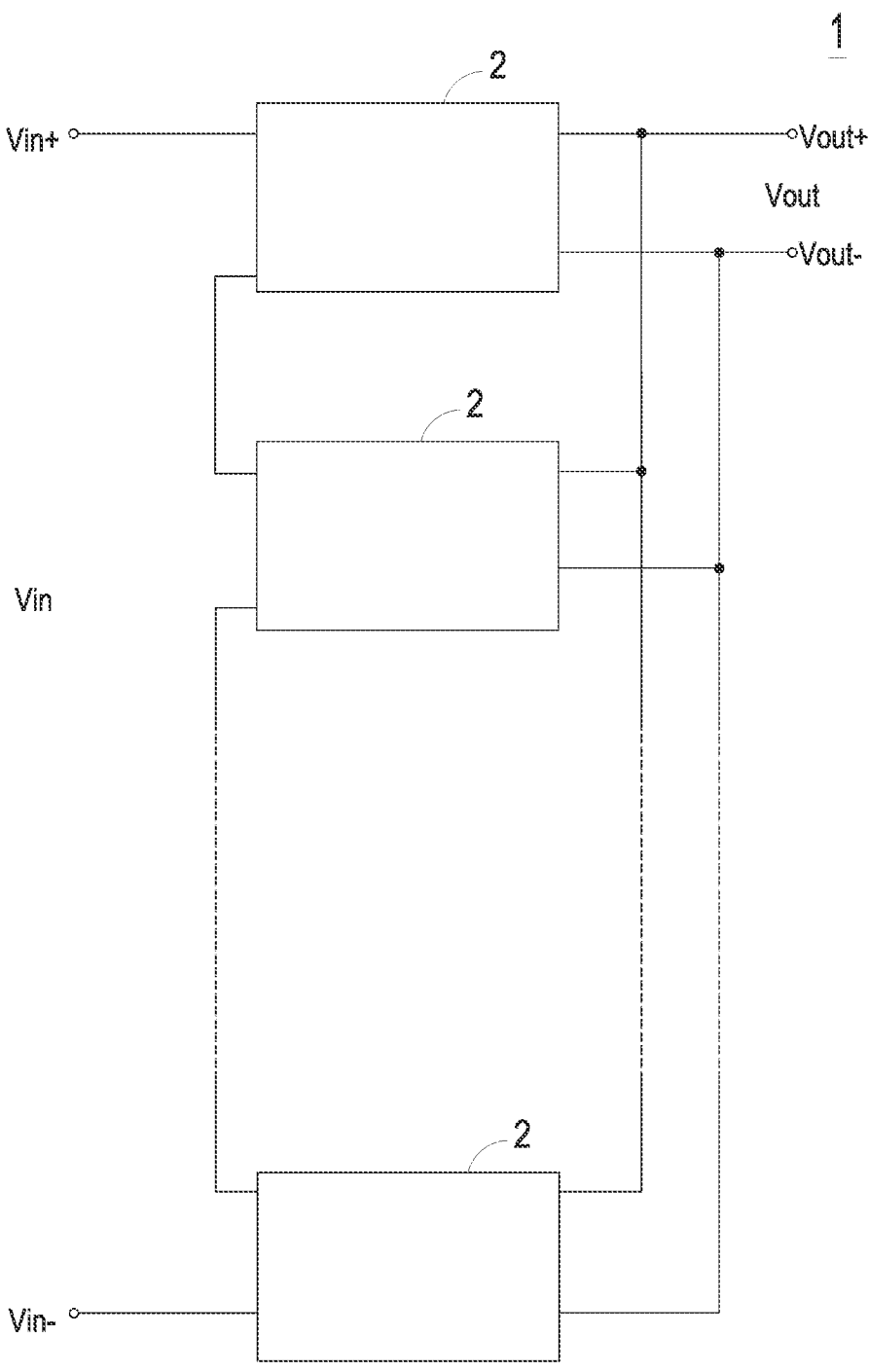
FIG. 1 is a schematic circuit diagram illustrating an isolated DC-DC converter according to a first embodiment of the present disclosure.
Figure 2:
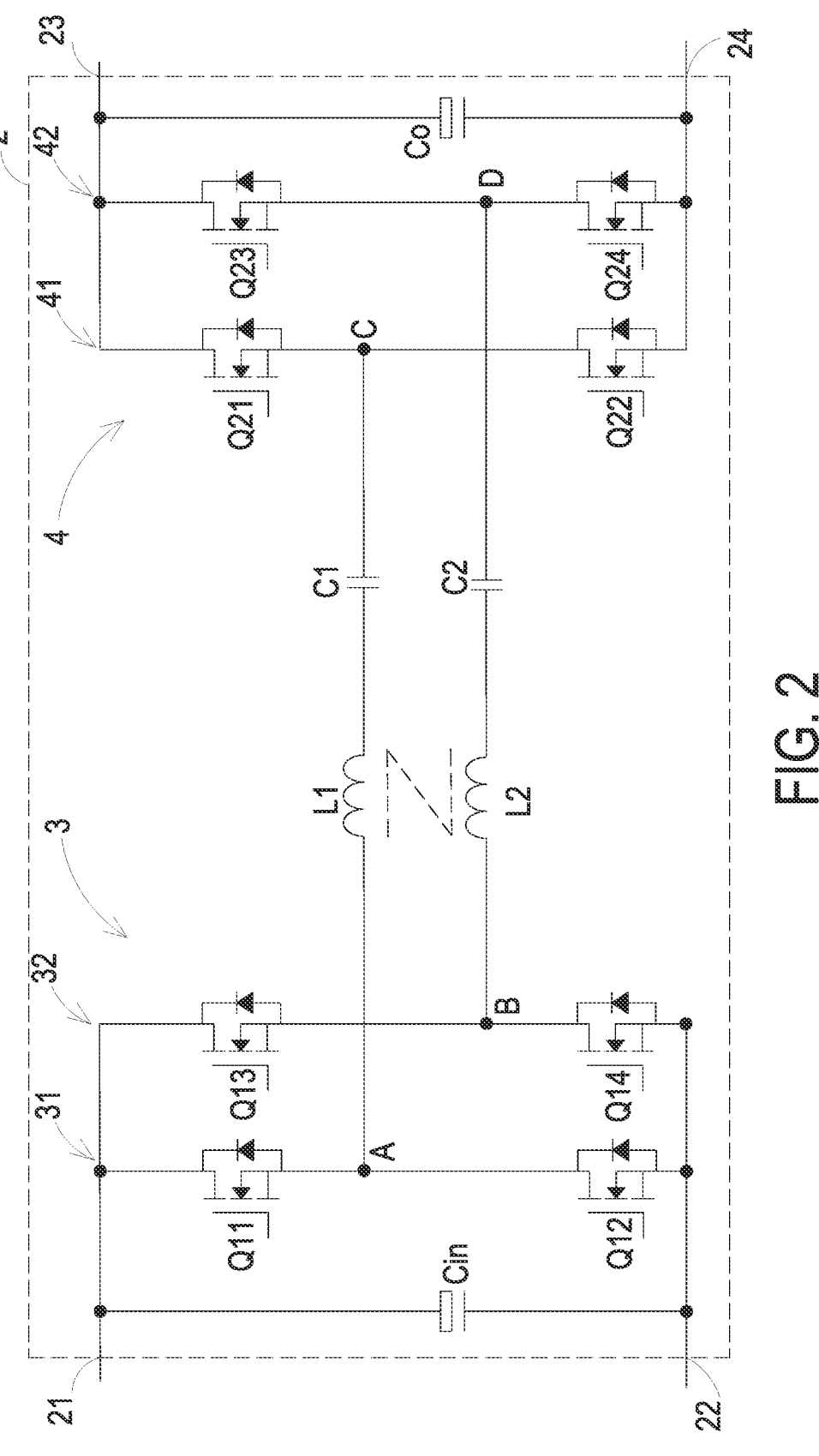
FIG. 2 is a schematic circuit diagram illustrating a first implementation of the conversion circuit unit of the isolated DC-DC converter of FIG. 1.

Please refer to FIG. 1 and FIG. 2. FIG. 1 is a schematic circuit diagram illustrating an isolated DC-DC converter according to a first embodiment of the present disclosure. FIG. 2 is a schematic circuit diagram illustrating a first implementation of the conversion circuit unit of the isolated DC-DC converter of FIG. 1. As shown in FIG. 1, the isolated DC-DC converter 1 receives an input power through a positive input terminal Vin+ and a negative input terminal Vin−, converts the input power, and outputs an output power through a positive output terminal Vout+ and a negative output terminal Vout- to a load (not shown). The isolated DC-DC converter 1 includes n conversion circuit units 2, and n is an integer greater than or equal to 2. In this embodiment, the input terminals of the n conversion circuit units 2 are electrically connected in series, and the output terminals of the n conversion circuit units 2 are electrically connected in parallel. Accordingly, the buck function of the isolated DC-DC converter is achieved. The number of conversion circuit units 2 is related to the ability of voltage step-down and transmission power.

FIG. 2 shows the interior circuit topology of a single conversion circuit unit 2, and the interior circuit topology of each conversion circuit unit 2 of FIG. 1 may be the same as that shown in FIG. 2. As shown in FIG. 2, the conversion circuit unit 2 includes a first input terminal 21, a second input terminal 22, a first output terminal 23 and a second output terminal 24. The first input terminal 21 of the first conversion circuit unit 2 in the n conversion circuit units 2 is electrically connected to the positive input terminal Vin+, and the second input terminal 22 of the nth conversion circuit unit 2 is electrically connected to the negative input terminal Vin−. Further, in the n conversion circuit units 2, the second input terminal 22 of the mth conversion circuit unit 2 is electrically connected to the first input terminal 21 of the (m+1)th conversion circuit unit 2, where 1<m<n. The n first output terminals 23 of the n conversion circuit units 2 are connected to each other and are connected to the positive output terminal Vout+. The n second output terminals 24 of the n conversion circuit units 2 are connected to each other and are connected to the negative output terminal Vout-.

The conversion circuit unit 2 includes a primary circuit unit 3, a secondary circuit unit 4, a first coupling inductor L1, a first capacitor C1, a second coupling inductor L2 and a second capacitor C2. The primary circuit unit 3 is a full-bridge circuit including a first primary bridge arm 31 and a second primary bridge arm 32 electrically connected in parallel. The first primary bridge arm 31 includes two first switching components Q11 and Q12, which may be implemented by transistors. The two first switching components Q11 and Q12 are electrically connected in series, and the connection node between the two first switching components Q11 and Q12 forms a first connection node A. The second primary bridge arm 32 includes two first switching components Q13 and Q14, which may be implemented by transistors in this embodiment. The two first switching components Q13 and Q14 are electrically connected in series, and the connection node between the two first switching components Q13 and Q14 forms a second connection node B. In some other embodiments, the primary circuit unit 3 is a half-bridge circuit including a first primary bridge arm 31 and a second primary bridge arm 32 electrically connected in parallel. The first primary bridge arm 31 includes two first switching components Q11 and Q12, which may be implemented by transistors. The two first switching components Q11 and Q12 are electrically connected in series, and the connection node between the two first switching components Q11 and Q12 forms a first connection node A. The second primary bridge arm 32 includes two capacitors electrically connected in series, and the connection node between the two capacitors forms a second connection node B.

The secondary circuit unit 4 is a full-bridge circuit including a first secondary bridge arm 41 and a second secondary bridge arm 42 electrically connected in parallel. The first secondary bridge arm 41 includes two second switching components Q21 and Q22, which may be implemented by transistors or diodes. In this embodiment, the two second switching components Q21 and Q22 are implemented by transistors. The two second switching components Q21 and Q22 are electrically connected in series, and the connection node between the two second switching components Q21 and Q22 forms a third connection node C. The second secondary bridge arm 42 includes two second switching components Q23 and Q24, which may be implemented by transistors or diodes. In this embodiment, the two second switching components Q23 and Q24 are implemented by transistors. The two second switching components Q23 and Q24 are electrically connected in series, and the connection node between the two second switching components Q23 and Q24 forms a fourth connection node D.

The first coupling inductor L1 and the first capacitor C1 are electrically coupled in series between the first connection node A and the third connection node C. Further, in this embodiment, a first terminal of the first coupling inductor L1 is electrically connected to the first connection node A, a second terminal of the first coupling inductor L1 is electrically connected to a first terminal of the first capacitor C1, and a second terminal of the first capacitor C1 is electrically connected to the third connection node C. The second coupling inductor L2 and the second capacitor C2 are electrically coupled in series between the second connection node B and the fourth connection node D. In this embodiment, a first terminal of the second coupling inductor L2 is electrically connected to the second connection node B, a second terminal of the second coupling inductor L2 is electrically connected to a first terminal of the second capacitor C2, and a second terminal of the second capacitor C2 is electrically connected to the fourth connection node D. The first coupling inductor L1 and the second coupling inductor L2 are coupled to each other, and the coupling coefficient of the first coupling inductor L1 and the second coupling inductor L2 is less than 1. For example, the coupling coefficient may be between 0.2 and 0.8, which represents that a part of the first coupling inductor L1 and a part of the second coupling inductor L2 are coupled to each other. In an embodiment, the coupling coefficient may be 0.5. The non-coupled part between the first coupling inductor L1 and the second coupling inductor L2 resonates with the first capacitor C1 and the second capacitor C2 to realize the power conversion. Otherwise, the coupled part between the first coupling inductor L1 and the second coupling inductor L2 can equalize the current flowing through the first connection node A and the third connection node C and the current flowing through the second connection node B and the fourth connection nodes D, so as to further balance the currents of the conversion circuit units 2 of the isolated DC-DC converter 1.

Figure 11A:
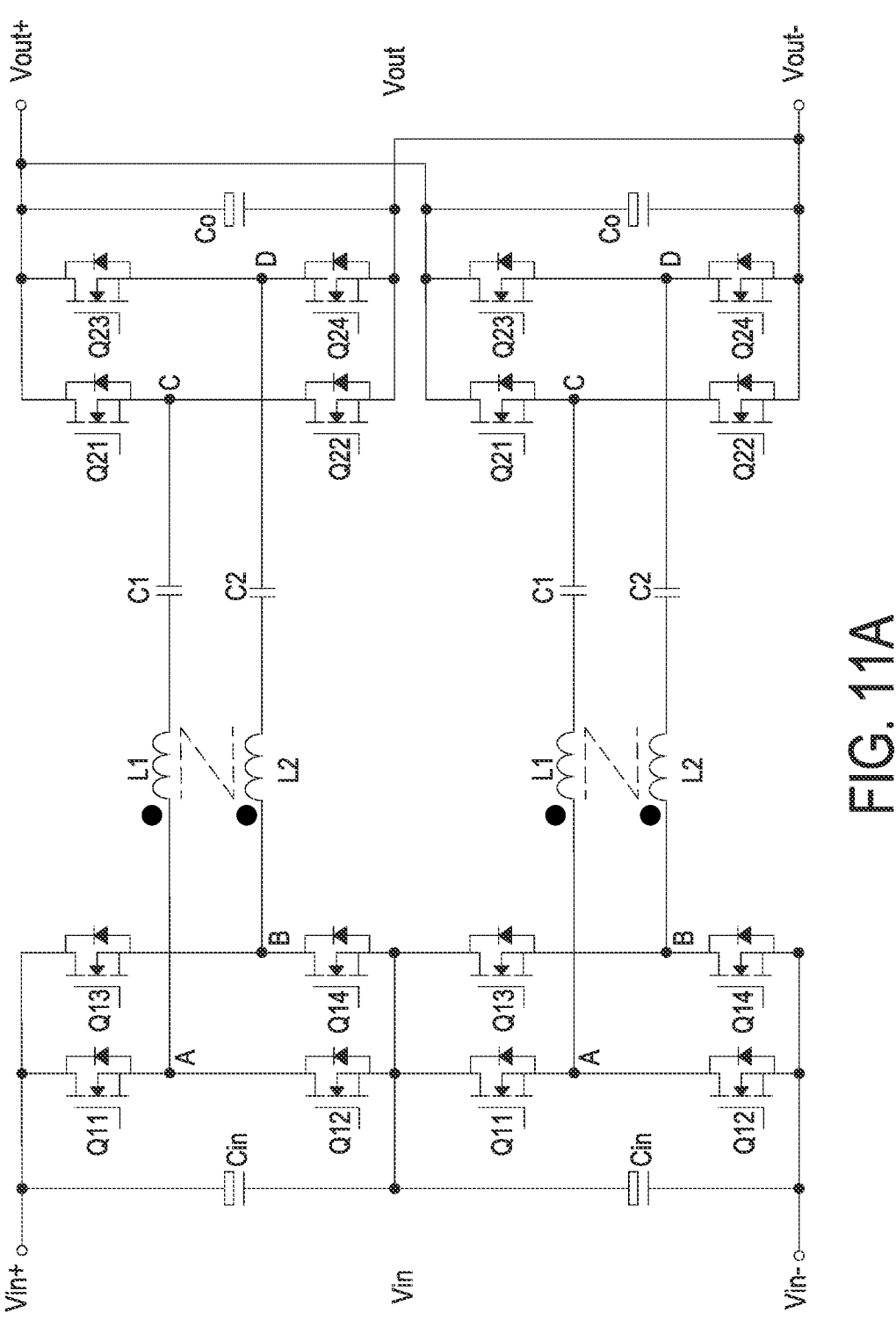
FIG. 11A is a schematic circuit diagram illustrating an isolated DC-DC converter including two conversion circuit units.
Figure 11B:
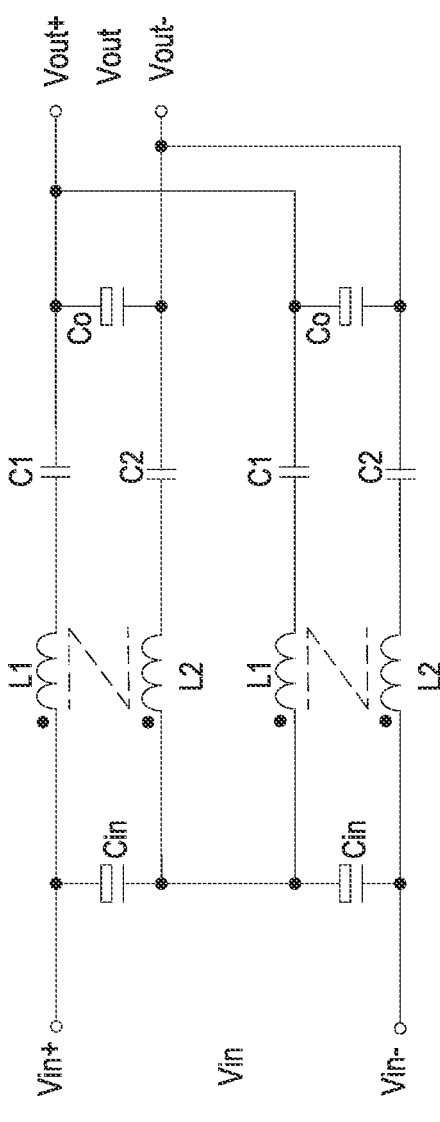
FIG. 11B shows the equivalent circuit of FIG. 11A when the current flowing through the first coupling inductor L1 is at the positive half cycle of AC current.

Due to the limitations of the existed manufacturing technology, the parameters of the inductors, capacitors and switching components of the isolated DC-DC converter may have some errors, which would cause the currents of the conversion circuit units in the isolated DC-DC converter unbalanced. The current unbalance may cause the heat unbalance of the isolated DC-DC converter, and the severe heat unbalance may damage the isolated DC-DC converter. In the isolated DC-DC converter of the present disclosure, the first coupling inductor L1 and the second coupling inductor L2 of the conversion circuit unit 2 are coupled to each other, and the coupling manner can equalize the current flowing through the first connection node A and the third connection node C and the current flowing through the second connection node B and the fourth connection node D to realize current balance. In specific, taking the embodiment of the isolated DC-DC converter 1 including two conversion circuit units 2 as an example, the corresponding circuit topology is shown in FIG. 11A, and FIG. 11B shows the equivalent circuit of FIG. 11A when the current flowing through the first coupling inductor L1 is at the positive half cycle of AC current. The first coupling inductor L1 and the second coupling inductor L2 are coupled to each other. When the current flowing through the first coupling inductor L1 and the current flowing through the second coupling inductor L2 are unbalanced, the coupling coefficient between the first coupling inductor L1 and the second coupling inductor L2 may be adjusted to equalize the current flowing through the first connection node A and the third connection node C and the current flowing through the second connection node B and the fourth connection node D to realize current balance, so as to balance the currents of the conversion circuit units 2 of the isolated DC-DC converter 1. For example, when the current flowing through the first coupling inductor L1 is larger than the current flowing through the second coupling inductor L2, the coupled part between the first coupling inductor L1 and the second coupling inductor L2 would generate a back-electromotive force. The back-electromotive force decreases the current flowing through the first coupling inductor L1 and increases the current flowing through the second coupling inductor L2, thereby equalizing the currents flowing through the first coupling inductor L1 and the second coupling inductor L2 and realizing current balance. It is noted that the above way of realizing current balance can also be applied in the circumstance that the current flowing through the first coupling inductor L1 is at the negative half cycle.

In an embodiment, the positions of the first coupling inductor L1 and the first capacitor C1 may be exchanged. Namely, the first terminal of the first capacitor C1 is electrically connected to the first connection node A, the second terminal of the first capacitor C1 is electrically connected to the first terminal of the first coupling inductor L1, and the second terminal of the first coupling inductor L1 is electrically connected to the third connection node C. In addition, the positions of the second coupling inductor L2 and the second capacitor C2 may be exchanged. Namely, the first terminal of the second capacitor C2 is electrically connected to the second connection node B, the second terminal of the second capacitor C2 is electrically connected to the first terminal of the second coupling inductor L2, and the second terminal of the second coupling inductor L2 is electrically connected to the fourth connection node D.

In the present disclosure, the conversion circuit unit 2 of the isolated DC-DC converter 1 includes a first coupling inductor L1, a first capacitor C1, a second coupling inductor L2 and a second capacitor C2. The first coupling inductor L1 and the first capacitor C1 are electrically coupled between the first connection node A and the third connection node C, and the second coupling inductor L2 and the second capacitor C2 are electrically coupled between the second connection node B and the fourth connection node D. In the isolated DC-DC converter 1 of the present disclosure, the conversion circuit unit 2 utilizes the first capacitor C1 and the second capacitor C2 to realize electrical isolation, and utilizes the first branch circuit formed by the first coupling inductor L1 and the first capacitor C1 and the second branch circuit formed by the second coupling inductor L2 and the second capacitor C2 to perform resonance conversion. Compared with the transformer of the conventional DC-DC converter, the inductors and capacitors of the conversion circuit unit 2 have smaller size, lower loss and higher heat dissipation capacity. Based on the characteristic of withstanding voltage of capacitors, the isolated DC-DC converter 1 replaces the transformer by the capacitors to realize electrical isolation. Accordingly, compared with the conventional DC-DC converter, the isolated DC-DC converter 1 of the present disclosure achieves the advantages of smaller size, lower loss and higher heat dissipation capacity. Consequently, the overall efficiency and power density of the isolated DC-DC converter 1 of the present disclosure is higher. In addition, in the isolated DC-DC converter 1 of the present disclosure, since the conversion circuit unit 2 includes the first coupling inductor L1 and the second coupling inductor L2 coupled to each other, the current flowing through the first connection node A and the third connection node C and the current flowing through the second connection node B and the fourth connection node D are equalized, and further the currents of the conversion circuit units 2 of the isolated DC-DC converter 1 are balanced.

As shown in FIG. 2, in this embodiment, the conversion circuit unit 2 of the isolated DC-DC converter 1 may further include an input capacitor Cin and an output capacitor Co. The input capacitor Cin and the first primary bridge arm 31 and the second primary bridge arm 32 of the primary circuit unit 3 are electrically connected in parallel. The output capacitor Co and the first secondary bridge arm 41 and the second secondary bridge arm 42 of the secondary circuit unit 4 are electrically connected in parallel.

Please refer to FIG. 1 and FIG. 2 again. Each of the n conversion circuit units 2 includes a first coupling inductor L1 and a second coupling inductor L2 coupled to each other. In other words, the n conversion circuit units 2 includes n first coupling inductors L1 and n second coupling inductors L2 in total. In an embodiment, all windings of the n first coupling inductors L1 and all windings of the n second coupling inductors L2 may be wound on the same magnetic core. In another embodiment, each pair of the windings of the first coupling inductor L1 and the second coupling inductor L2 coupled to each other is wound on a corresponding magnetic core. Under this circumstance, n pairs of the windings of the n first coupling inductors L1 and the n second coupling inductor L2 of the n conversion circuit units 2 may be wound on n magnetic cores respectively.

Figure 3:
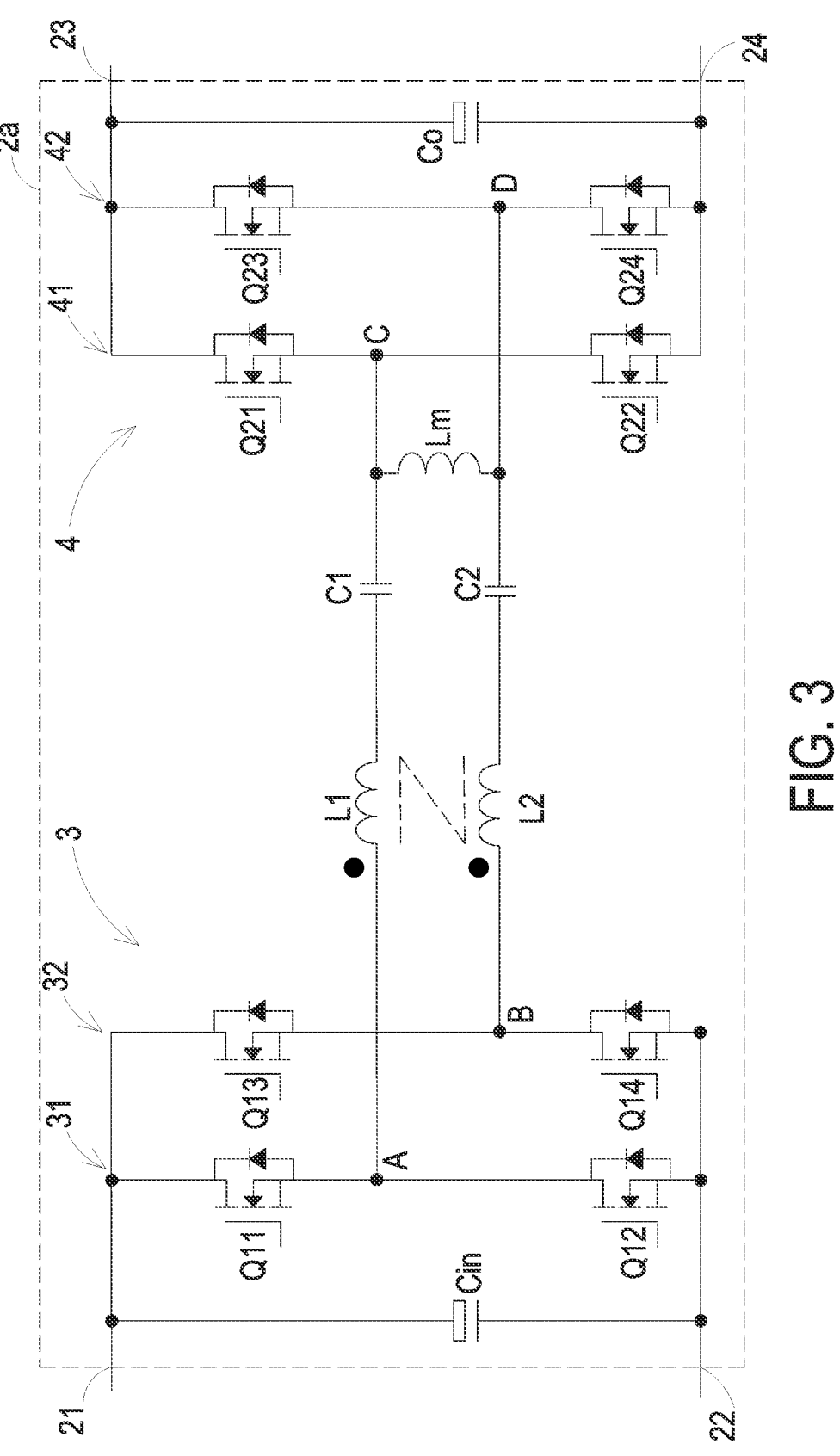
FIG. 3 is a schematic circuit diagram illustrating a second implementation of the conversion circuit unit of the isolated DC-DC converter of FIG. 1.

In an embodiment, the conversion circuit unit of the isolated DC-DC converter may further include a magnetizing inductor for expanding the range of the adjustable gain (Vo/Vin) of the conversion circuit unit of the isolated DC-DC converter. Please refer to FIG. 3 with FIG. 1. FIG. 3 is a schematic circuit diagram illustrating a second implementation of the conversion circuit unit of the isolated DC-DC converter of FIG. 1. Compared with the conversion circuit unit 2 shown in FIG. 2, the conversion circuit unit 2a in this embodiment further includes a magnetizing inductor Lm electrically connected between the third connection node C and the fourth connection node D. The magnetizing inductor Lm allows the range of the adjustable gain of the conversion circuit unit of the isolated DC-DC converter to become wider. Of course, the positions of the coupling inductors and capacitors can also be changed as mentioned above, and thus the detailed descriptions thereof are omitted herein.

Figure 4:
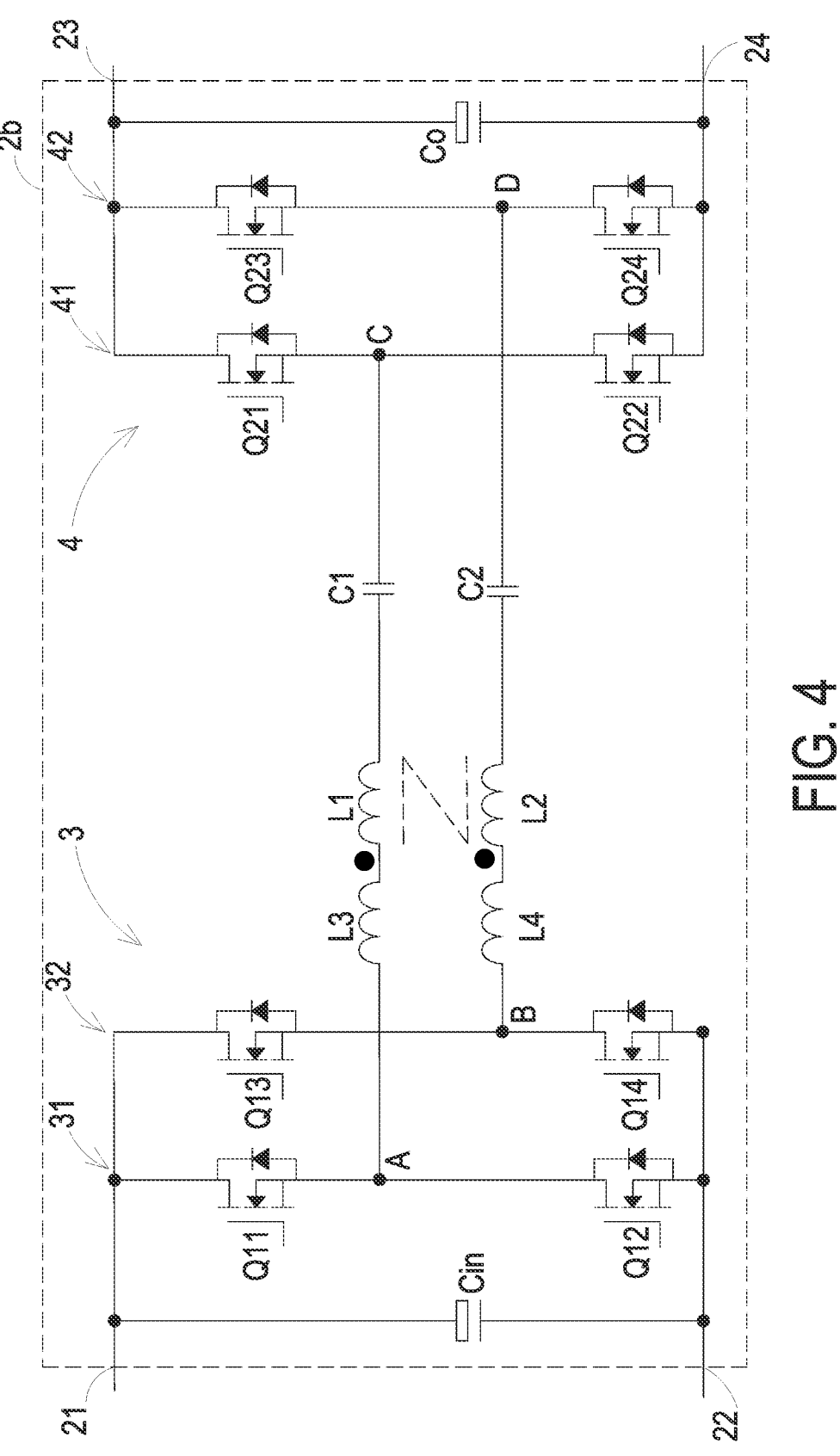
FIG. 4 is a schematic circuit diagram illustrating a third implementation of the conversion circuit unit of the isolated DC-DC converter of FIG. 1.

Please refer to FIG. 4 with FIG. 1. FIG. 4 is a schematic circuit diagram illustrating a third implementation of the conversion circuit unit of the isolated DC-DC converter of FIG. 1. Compared with the conversion circuit unit 2 shown in FIG. 2, the conversion circuit unit 2b in this embodiment further includes a first resonant inductor L3 and a second resonant inductor L4. The first resonant inductor L3, the first coupling inductor L1 and the first capacitor C1 are electrically coupled in series between the first connection node A and the third connection node C. Further, in this embodiment, a first terminal of the first resonant inductor L3 is electrically connected to the first connection node A, a second terminal of the first resonant inductor L3 is electrically connected to the first terminal of the first coupling inductor L1, the second terminal of the first coupling inductor L1 is electrically connected to the first terminal of the first capacitor C1, and the second terminal of the first capacitor C1 is electrically connected to the third connection node C. The second resonant inductor L4, the second coupling inductor L2 and the second capacitor C2 are electrically coupled in series between the second connection node B and the fourth connection node D. Further, in this embodiment, a first terminal of the second resonant inductor L4 is electrically connected to the second connection node B, a second terminal of the second resonant inductor L4 is electrically connected to the first terminal of the first coupling inductor L2, the second terminal of the second coupling inductor L2 is electrically connected to the first terminal of the second capacitor C2, and the second terminal of the second capacitor C2 is electrically connected to the fourth connection node D. In this embodiment, the first coupling inductor L1 and the second coupling inductor L2 are coupled to each other, and the coupling coefficient thereof may be less than or equal to 1 and greater than or equal to 0.9, which means that the first coupling inductor L1 and the second coupling inductor L2 are fully coupled. In an embodiment, the coupling coefficient may be 1. The first coupling inductance L1 and the second coupling inductance L2 are coupled to each other to equalize the current flowing through the first connection node A and the third connection node C and the current flowing through the second connection node B and the fourth connection node D. In addition, the first resonant inductor L3, the second resonant inductor L4, the first capacitor C1 and the second capacitor C2 may perform series resonance collaboratively to realize power conversion.

Figure 5:
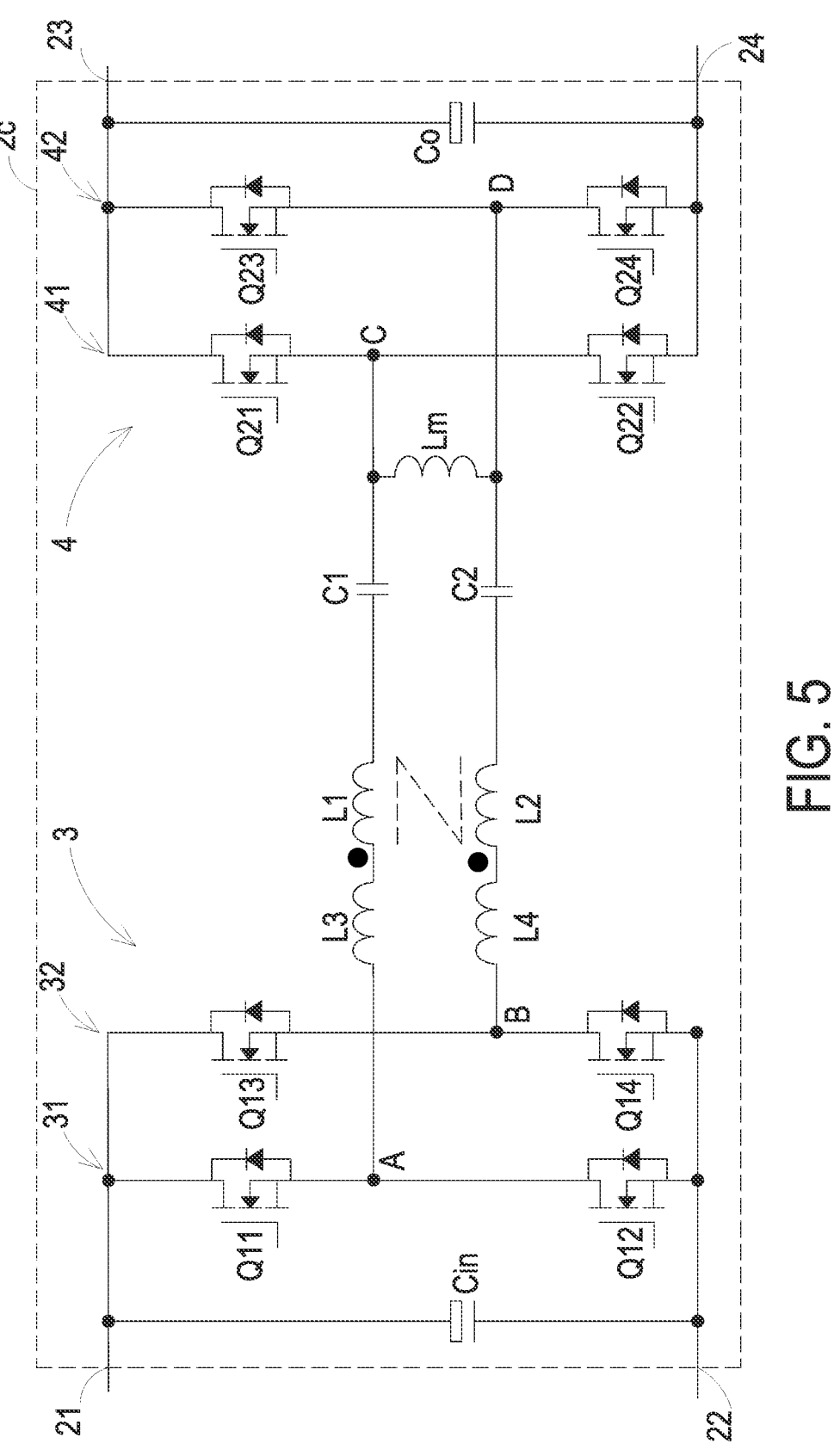
FIG. 5 is a schematic circuit diagram illustrating a fourth implementation of the conversion circuit unit of the isolated DC-DC converter of FIG. 1.

Of course, in some embodiments, the conversion circuit unit of the isolated DC-DC converter may include the magnetizing inductor, the first resonant inductor and the second resonant inductor at the same time. Please refer to FIG. 5 with FIG. 1. FIG. 5 is a schematic circuit diagram illustrating a fourth implementation of the conversion circuit unit of the isolated DC-DC converter of FIG. 1. Compared with the conversion circuit unit 2b shown in FIG. 4, the conversion circuit unit 2c in this embodiment further includes a magnetizing inductor Lm electrically connected between the third connection node C and the fourth connection node D. The magnetizing inductor Lm allows the range of the adjustable gain of the conversion circuit unit of the isolated DC-DC converter to become wider. Of course, the positions of the coupling inductors and capacitors can also be changed as mentioned above, and thus the detailed descriptions thereof are omitted herein.

Figure 6:
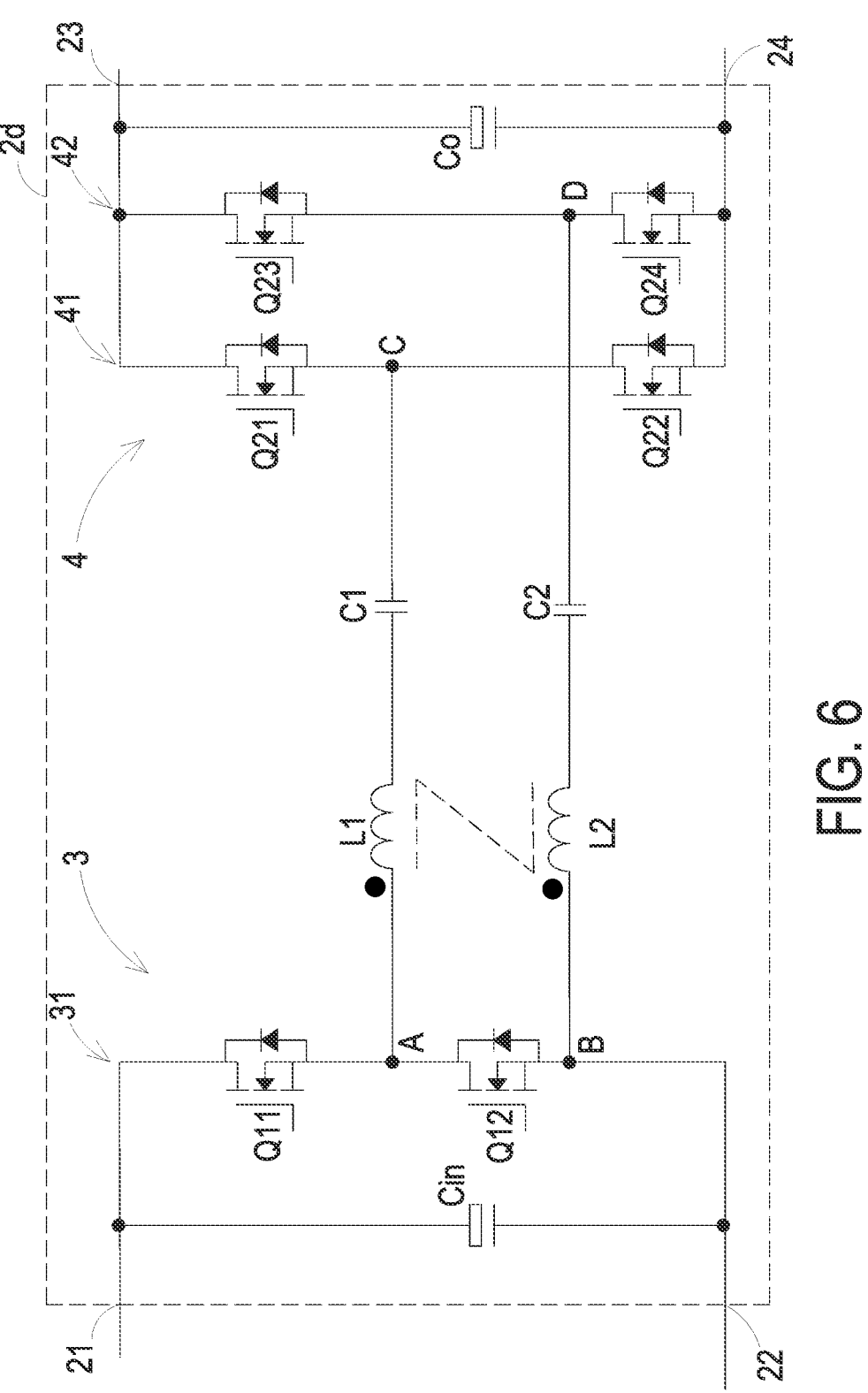
FIG. 6 is a schematic circuit diagram illustrating a fifth implementation of the conversion circuit unit of the isolated DC-DC converter of FIG. 1.

In an embodiment, the primary circuit unit of the conversion circuit unit of the isolated DC-DC converter may be a half-bridge circuit including one bridge arm. Please refer to FIG. 6 with FIG. 1. FIG. 6 is a schematic circuit diagram illustrating a fifth implementation of the conversion circuit unit of the isolated DC-DC converter of FIG. 1. Compared with the primary circuit unit 3, including two bridge arms, of the conversion circuit unit 2 shown in FIG. 2, the conversion circuit unit 2d in this embodiment includes only one bridge arm, i.e., the primary bridge arm 31. The primary bridge arm 31 is electrically connected between the first input terminal 21 and the second input terminal 22 and includes two first switching components Q11 and Q12, which may be implemented by transistors. The two first switching components Q11 and Q12 are electrically connected in series, and the connection node between the two first switching components Q11 and Q12 forms a first connection node A. The connection node between the first switching component Q12 and the second input terminal 22 forms a second connection node B, that is, the connection node between the first switching component Q12 and the negative input terminal Vin– forms the second connection node B. In another embodiment, the second connection node B may be formed by the connection node between the first switching component Q11 and the first input terminal 21, that is, the connection node between the first switching component Q11 and the positive input terminal Vin+ forms the second connection node B. In addition, in the embodiment shown in FIG. 6, the first coupling inductor L1 and the first capacitor C1 are electrically coupled in series between the first connection node A and the third connection node C, the second coupling inductor L2 and the second capacitor C2 are electrically coupled in series between the second connection node B and the fourth connection node D, the connection way is similar to that shown in FIG. 2, and thus the detailed descriptions thereof are omitted herein.

Figure 7:
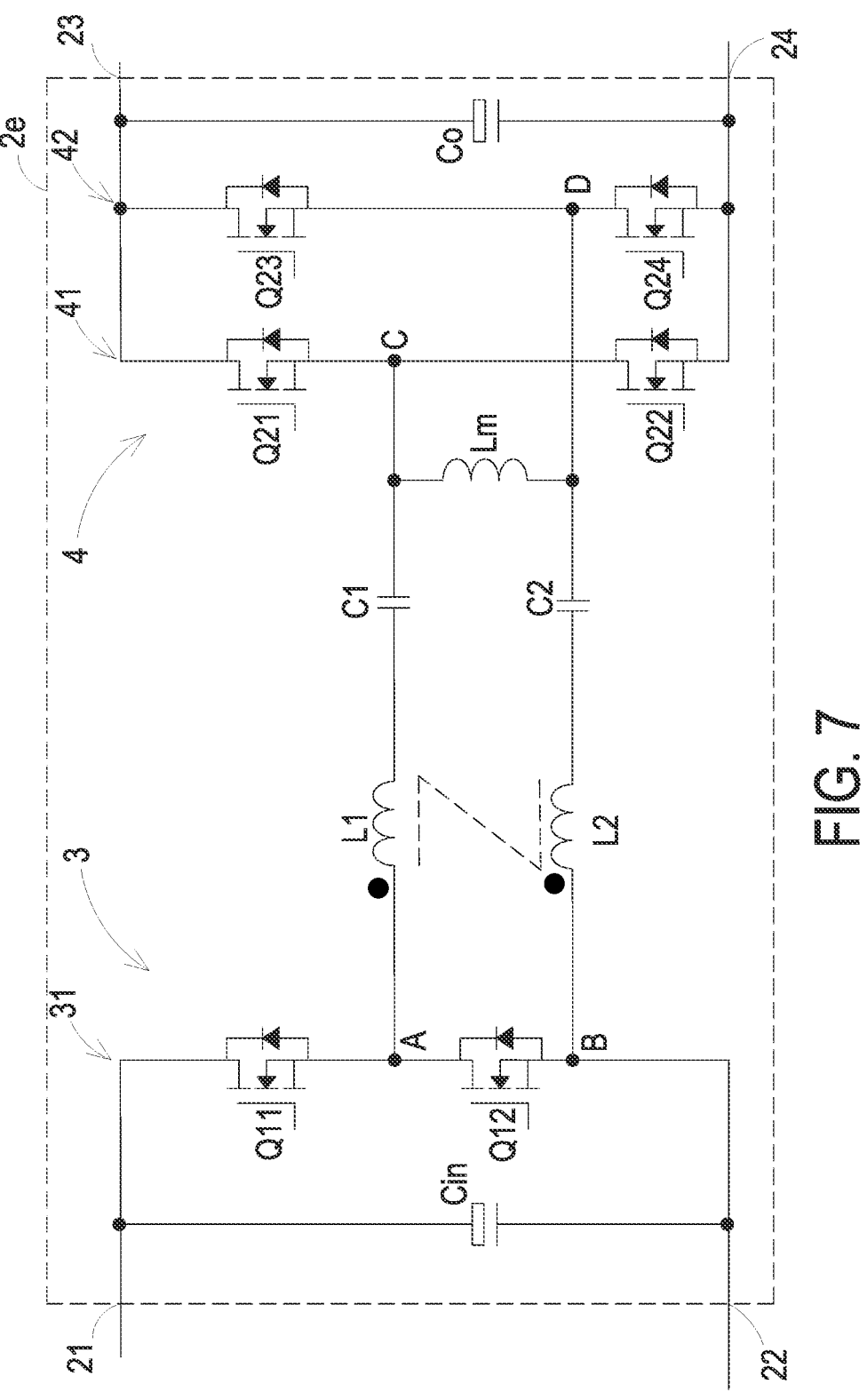
FIG. 7 is a schematic circuit diagram illustrating a sixth implementation of the conversion circuit unit of the isolated DC-DC converter of FIG. 1.

In an embodiment, under the circumstance that the primary circuit unit of the conversion circuit unit of the isolated DC-DC converter is a half-bridge circuit, the conversion circuit unit of the isolated DC-DC converter may also include a magnetizing inductor. Please refer to FIG. 7 with FIG. 1. FIG. 7 is a schematic circuit diagram illustrating a sixth implementation of the conversion circuit unit of the isolated DC-DC converter of FIG. 1. Compared with the conversion circuit unit 2*d* shown in FIG. 6, the conversion circuit unit 2*e* in this embodiment further includes a magnetizing inductor Lm electrically connected between the third connection node C and the fourth connection node D. The magnetizing inductor Lm allows the range of the adjustable gain of the conversion circuit unit of the isolated DC-DC converter to become wider. Of course, the positions of the coupling inductors and capacitors can also be changed as mentioned above, and thus the detailed descriptions thereof are omitted herein.

Figure 8:
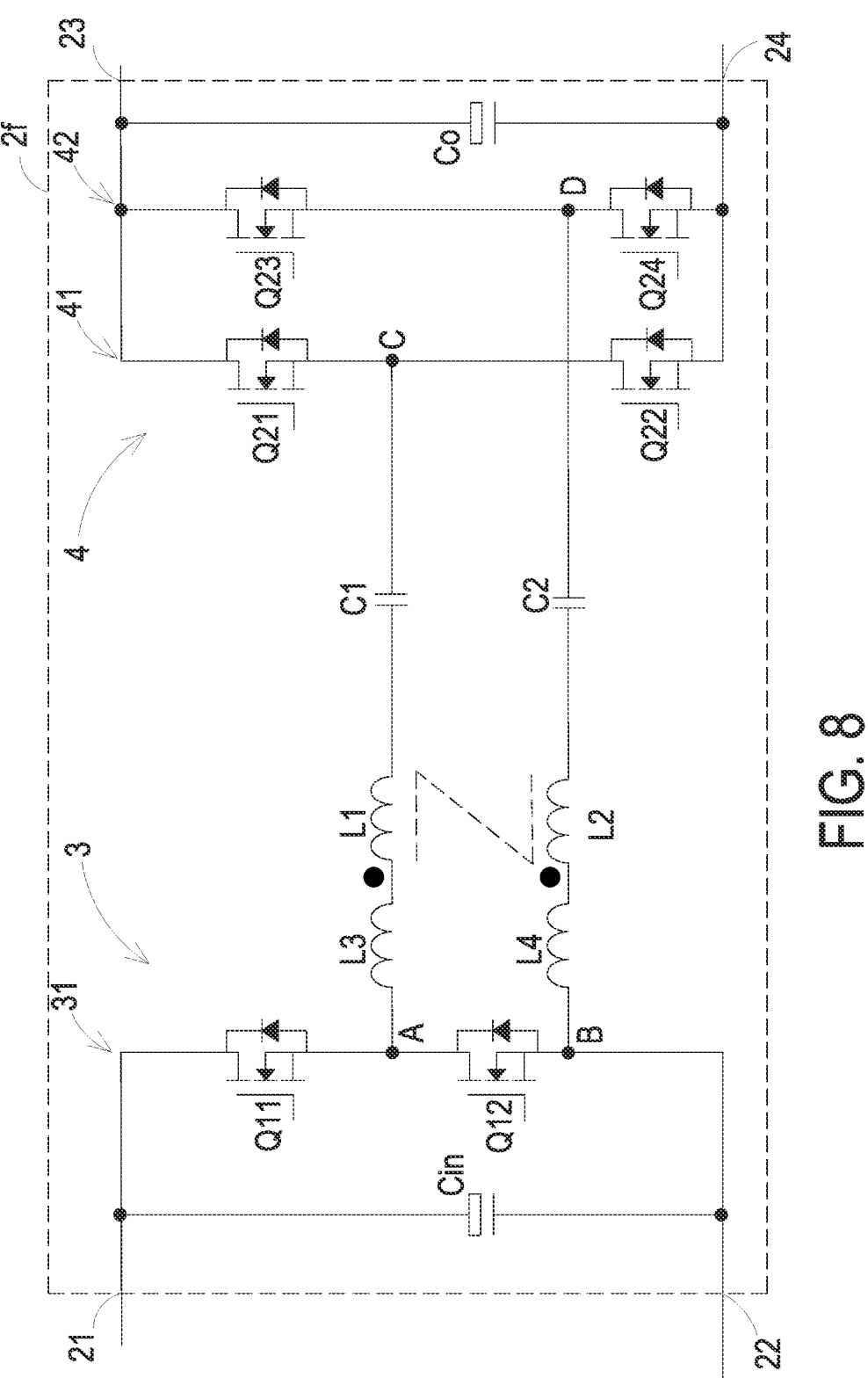
FIG. 8 is a schematic circuit diagram illustrating a seventh implementation of the conversion circuit unit of the isolated DC-DC converter of FIG. 1.

In an embodiment, under the circumstance that the primary circuit unit of the conversion circuit unit of the isolated DC-DC converter is a half-bridge circuit, the conversion circuit unit of the isolated DC-DC converter may also include a first resonant inductor and a second resonant inductor. Please refer to FIG. 8 with FIG. 1. FIG. 8 is a schematic circuit diagram illustrating a seventh implementation of the conversion circuit unit of the isolated DC-DC converter of FIG. 1. Compared with the conversion circuit unit 2*d* shown in FIG. 6, the conversion circuit unit 2*f* in this embodiment further includes a first resonant inductor L3 and a second resonant inductor L4. The first resonant inductor L3, the first coupling inductor L1 and the first capacitor C1 are electrically coupled in series between the first connection node A and the third connection node C. Further, in this embodiment, the first terminal of the first resonant inductor L3 is electrically connected to the first connection node A, the second terminal of the first resonant inductor L3 is electrically connected to the first terminal of the first coupling inductor L1, the second terminal of the first coupling inductor L1 is electrically connected to the first terminal of the first capacitor C1, and the second terminal of the first capacitor C1 is electrically connected to the third connection node C. The second resonant inductor L4, the second coupling inductor L2 and the second capacitor C2 are electrically coupled in series between the second connection node B and the fourth connection node D. Further, in this embodiment, the first terminal of the second resonant inductor L4 is electrically connected to the second connection node B, the second terminal of the second resonant inductor L4 is electrically connected to the first terminal of the first coupling inductor L2, the second terminal of the second coupling inductor L2 is electrically connected to the first terminal of the second capacitor C2, and the second terminal of the second capacitor C2 is electrically connected to the fourth connection node D. In this embodiment, the first coupling inductor L1 and the second coupling inductor L2 are coupled to each other, and the coupling coefficient thereof may be less than or equal to 1 and greater than or equal to 0.9, which means that the first coupling inductor L1 and the second coupling inductor L2 are fully coupled to equalize the current flowing through the first connection node A and the third connection node C and the current flowing through the second connection node B and the fourth connection node D. In an embodiment, the coupling coefficient is 1. In addition, the first resonant inductor L3, the second resonant inductor L4, the first capacitor C1 and the second capacitor C2 may perform series resonance collaboratively to realize power conversion.

Figure 9:
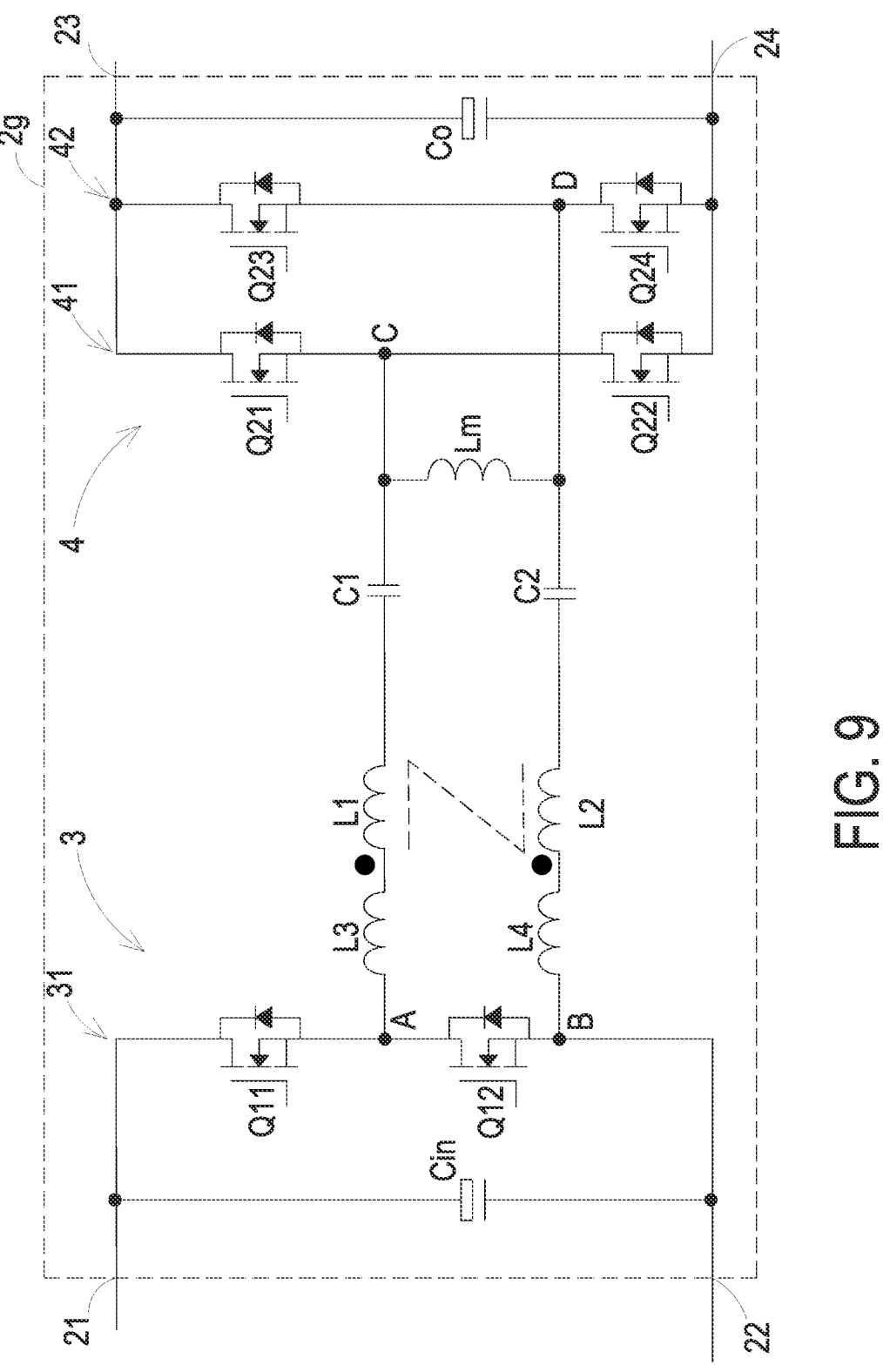
FIG. 9 is a schematic circuit diagram illustrating an eighth implementation of the conversion circuit unit of the isolated DC-DC converter of FIG. 1.

In an embodiment, under the circumstance that the primary circuit unit of the conversion circuit unit of the isolated DC-DC converter is a half-bridge circuit, the conversion circuit unit of the isolated DC-DC converter may include the magnetizing inductor, the first resonant inductor and the second resonant inductor at the same time. Please refer to FIG. 9 with FIG. 1. FIG. 9 is a schematic circuit diagram illustrating an eighth implementation of the conversion circuit unit of the isolated DC-DC converter of FIG. 1. Compared with the conversion circuit unit 2*f* shown in FIG. 8, the conversion circuit unit 2*g* in this embodiment further includes a magnetizing inductor Lm electrically connected between the third connection node C and the fourth connection node D. The magnetizing inductor Lm allows the range of the adjustable gain of the conversion circuit unit of the isolated DC-DC converter to become wider. Of course, the positions of the coupling inductors and capacitors can also be changed as mentioned above, and thus the detailed descriptions thereof are omitted herein.

Figure 10:
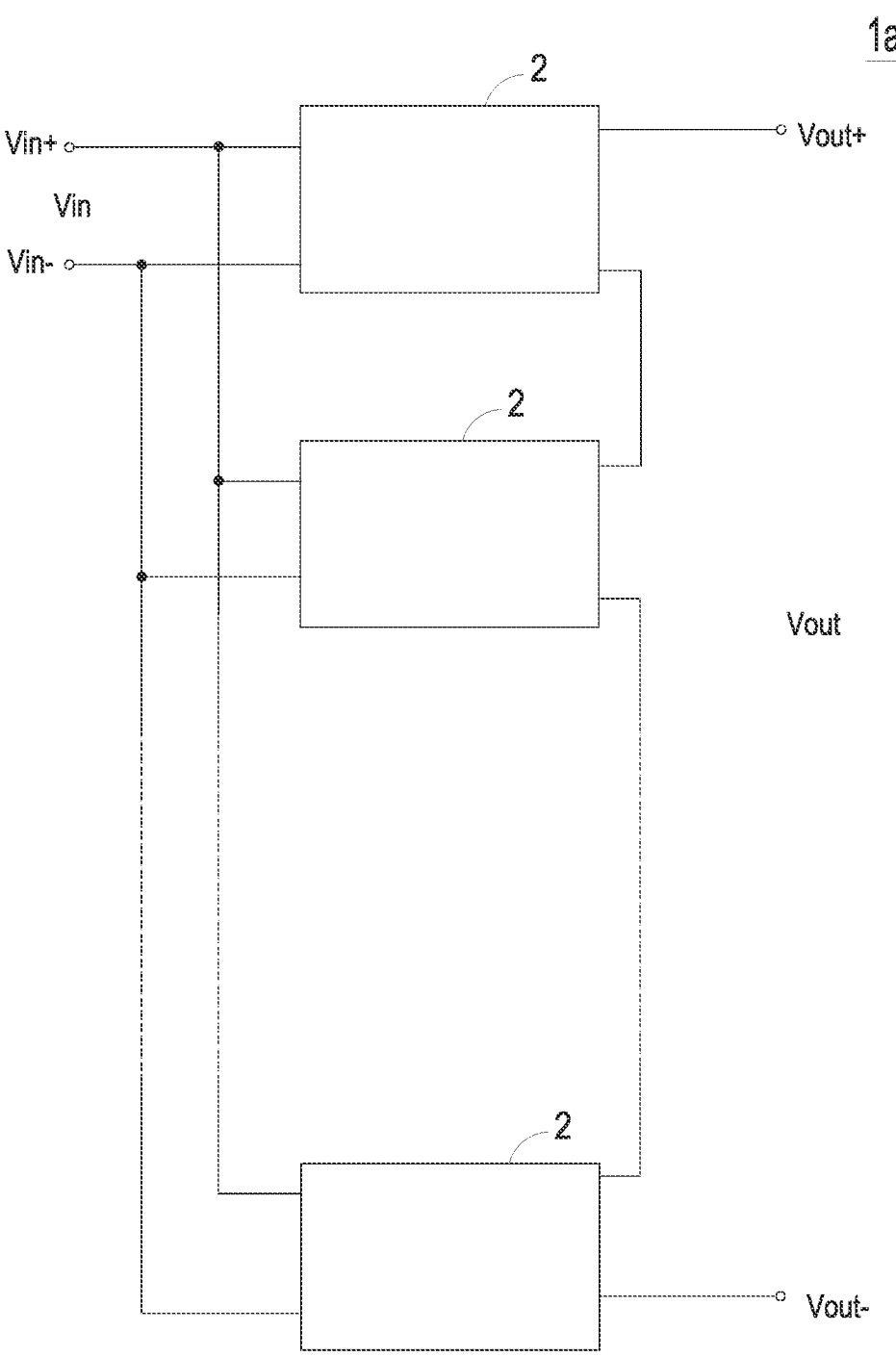
FIG. 10 is a schematic circuit diagram illustrating an isolated DC-DC converter according to a second embodiment of the present disclosure.

In an embodiment, in order to realize the boost function by the isolated DC-DC converter, the input terminals of the n conversion circuit units are electrically connected in parallel, and the output terminals of the n conversion circuit units are electrically connected in series. Please refer to FIG. 10. FIG. 10 is a schematic circuit diagram illustrating an isolated DC-DC converter according to a second embodiment of the present disclosure. As shown in FIG. 10, in the isolated DC—DC converter 1*a* of this embodiment, the input terminals of the n conversion circuit units 2 are electrically connected in parallel, and the output terminals of the n conversion circuit units 2 are electrically connected in series. Accordingly, the boost function of the isolated DC-DC converter is achieved. The number of conversion circuit units 2 is related to the ability of voltage step-up and transmission power. Each conversion circuit unit 2 of the isolated DC-DC converter 1*a* may be implemented by any of the conversion circuit units shown in above-mentioned embodiments, and thus the detailed descriptions thereof are omitted herein.

In summary, in the isolated DC-DC converter provided by the present disclosure, the conversion circuit unit includes a first coupling inductor, a first capacitor, a second coupling inductor and a second capacitor. The first coupling inductor and the first capacitor are electrically coupled between the first connection node and the third connection node, and the second coupling inductor and the second capacitor are electrically coupled between the second connection node and the fourth connection node. In the isolated DC-DC converter of the present disclosure, the conversion circuit unit utilizes the first capacitor and the second capacitor to realize electrical isolation, and utilizes the first branch circuit formed by the first coupling inductor and the first capacitor and the second branch circuit formed by the second coupling inductor and the second capacitor to perform resonance conversion. Compared with the transformer of the conventional DC-DC converter, the inductors and capacitors of the conversion circuit unit have smaller size, lower loss and higher heat dissipation capacity. Based on the characteristic of withstanding voltage of capacitors, the isolated DC-DC converter replaces the transformer by the capacitors to realize electrical isolation. Accordingly, compared with the conventional DC-DC converter, the isolated DC-DC converter of the present disclosure achieves the advantages of smaller size, lower loss and higher heat dissipation capacity. Consequently, the overall efficiency and power density of the isolated DC-DC converter of the present disclosure is higher. In addition, in the isolated DC-DC converter of the present disclosure, since the conversion circuit unit includes the first coupling inductor and the second coupling inductor coupled to each other, the current flowing through the first connection node and the third connection node and the current flowing through the second connection node and the fourth connection node are equalized, and further the currents of the conversion circuit units of the isolated DC-DC converter are balanced.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An isolated DC-DC converter, comprising:

n conversion circuit units, wherein n is an integer greater than or equal to 2, and each of the n conversion circuit units comprises:

a primary circuit unit, comprising a first primary bridge arm and a second primary bridge arm electrically connected in parallel, wherein the first primary bridge arm comprises two first switching components electrically connected in series, a connection node between the two first switching components of the first primary bridge arm forms a first connection node, the second primary bridge arm comprises two first electronic components electrically connected in series, and a connection node between the two first electronic components of the second primary bridge arm forms a second connection node;

a secondary circuit unit, comprising a first secondary bridge arm and a second secondary bridge arm electrically connected in parallel, wherein each of the first and second secondary bridge arms comprises two second switching components electrically connected in series, a connection node between the two second switching components of the first secondary bridge arm forms a third connection node, and a connection node between the two second switching components of the second secondary bridge arm forms a fourth connection node;

a first coupling inductor and a first capacitor electrically coupled in series between the first connection node and the third connection node; and a second coupling inductor and a second capacitor electrically coupled in series between the second connection node and the fourth connection node, wherein the first coupling inductor and the second coupling inductor are coupled to each other, wherein the first coupling inductor and the second coupling inductor are coupled with each other, so that a current flowing through the first connection node and the third connection node and a current flowing through the second connection node and the fourth connection node are balanced, and currents flowing through the n conversion circuit units are balanced;

wherein all the primary circuit units of the n conversion circuit units are electrically connected by one of connection modes comprising series connecting and parallel connecting, and all the secondary circuit units of the n conversion circuit units are electrically connected by a remaining one of the connection modes.

2. The isolated DC-DC converter according to claim 1, wherein each of the n conversion circuit units further comprises a magnetizing inductor electrically connected between the third connection node and the fourth connection node.

3. The isolated DC-DC converter according to claim 1, wherein a part of the first coupling inductor and a part of the second coupling inductor are coupled to each other, and another part of the first coupling inductor and another part of the second coupling inductor, which are not coupled to each other, resonate with the first capacitor and the second capacitor.

4. The isolated DC-DC converter according to claim 3, wherein a coupling coefficient of the first coupling inductor and the second coupling inductor is between 0.2 and 0.8.

5. The isolated DC-DC converter according to claim 1, wherein each of the n conversion circuit units further comprises a first resonant inductor and a second resonant inductor, the first resonant inductor is electrically coupled between the first connection node and the third connection node, the second resonant inductor is electrically coupled between the second connection node and the fourth connection node, and the first resonant inductor, the second resonant inductor, the first capacitor and the second capacitor perform series resonance collaboratively.

6. The isolated DC-DC converter according to claim 5, wherein the first coupling inductor and the second coupling inductor are fully coupled to each other.

7. The isolated DC-DC converter according to claim 6, wherein a coupling coefficient of the first coupling inductor and the second coupling inductor is less than or equal to 1 and is greater than or equal to 0.9.

8. The isolated DC-DC converter according to claim 1, wherein each of the n conversion circuit units further comprises an input capacitor electrically connected to the first primary bridge arm and the second primary bridge arm of the primary circuit unit in parallel.

9. The isolated DC-DC converter according to claim 1, wherein each of the n conversion circuit units further comprises an output capacitor electrically connected to the first secondary bridge arm and the second secondary bridge arm of the secondary circuit unit in parallel.

10. The isolated DC-DC converter according to claim 1, wherein the two first switching components are a transistor, the two first electronic components are a transistor or a capacitor, and the two second switching components are a transistor or a diode.

* * * * *